3,257,353
VACUUM-FORMING
Sidney Douglas Eagleton, Newport, England, assignor to Monsanto Chemicals Limited, London, England, a British company
No Drawing. Filed June 29, 1962, Ser. No. 206,202
Claims priority, application Great Britain, Aug. 1, 1961, 27,853/61
7 Claims. (Cl. 260—41)

This invention relates to vacuum-forming.

Vacuum-forming is a convenient process for producing a shaped article from a flat sheet of a thermoplastic resin, and it is used extensively. The process is particularly applicable to for instance sheets of styrene-based resins. However, in certain circumstances vacuum-forming sheets of these resins carries with it the disadvantage that bubbles or voids appear in the shaped sheets; this is particularly likely to occur if the sheets have been stored under conditions in which they have absorbed moisture from their surroundings.

A method whereby this can be avoided has now been discovered.

The process of the invention is one for vacuum-forming a sheet of a thermoplastic resin having a tendency to form voids in a vacuum-forming operation, in which the sheet is made from a thermoplastic resin composition containing from ½ to 10% by weight based on the resin of an inert desiccant so as to remove or substantially reduce the tendency towards void-formation.

Thermoplastic resins that are particularly appropriate to the process are, as has been stated, styrene-based resins, particularly impact polystyrenes and styrene and alpha-methylstyrene copolymers. Impact polystyrenes, of course, are polystyrenes that have been modified either before or after polymerization by incorporation of a rubber, which can be natural rubber or a synthetic rubber, for instance a styrenebutadiene rubber. Styrene copolymers include for instance copolymers of styrene with alpha-methylstyrene or acrylonitrile, and styrene/butadiene/acrylonitrile copolymers. Other kinds of resins to which the process of the invention can usefully be applied include polymers of such ethylenically unsaturated monomers as for example vinyl chloride, acrylonitrile, and acrylates such as for instance methyl methacrylate.

The inert desiccant is normally a solid, and is preferably one that absorbs water by a hydration reaction of some kind. It needs of course to be a material that is not decomposed at temperatures at which thermoplastic resins are worked. Examples of suitable desiccants are metal oxides such as for instance calcium, barium or magnesium oxide. Calcium oxide gives excellent results. Other desiccants that can be employed are magnesium perchlorate and fused calcium sulphate.

The amount of the desiccant employed depends on several factors, including its nature and that of the thermoplastic resin, but is preferably from 1% to 5% by weight of the resin. Excellent results have been obtained using about 3% by weight.

The desiccant can be mixed with the resin by any convenient method, for example by tumbling it directly in a drum with pellets or particles of the resin, optionally followed by extrusion into a strand which can then be chopped up to form pellets. Preferably, however, the desiccant in the form of a dispersion in a suitable carrier liquid, for example an oil such as a mineral oil, is mixed with pellets or particles of the resin; the dispersion can then if desired be blended further into the resin by use of a heated blender or mixer, and the resulting resin can be extruded and chopped into pellets.

The composition of the invention can be made into sheets by any of the several methods, for example, by extrusion or by a molding process such as compression molding or injection molding. The sheets are then suitable for use in a vacuum-forming process.

The invention is illustrated by the following example.

*Example*

This example describes a vacuum-forming operation according to the invention, using sheets of a toughened polystyrene composition containing calcium oxide as desiccant.

The following components were blended together in a softened state for ¼ hour in a double conical blender:

| | Grams |
|---|---|
| Pellets of a toughened polystyrene containing 8% of a styrene/butadiene rubber | 650 |
| Polystyrene pellets | 350 |
| Zinc stearate | 2.0 |
| Dispersion of three parts of calcium oxide in one part of mineral oil | 40 |

The resulting thermoplastic resin composition was extruded through a laboratory Ko-Kneader at 200–210° C. and the cooled strand of resin was chopped into pellets. The composition contained 3% of calcium oxide by weight of the total resin. The pellets were compression-molded at 185° C. into a number of circular sheets 6 inches in diameter and 0.125 inch thick.

For the purpose of comparison a similar composition but without the calcium oxide was produced and molded.

All of the discs were placed in an atmosphere of relative humidity of 85% for 275 hours, and were then vacuum-formed into a hemispherical shape. It is found that the vacuum-formed sheets made from the composition containing calcium oxide were free from voids or bubbles, whereas those made from the composition containing no calcium oxide possessed a large number of voids.

What is claimed is:

1. In a process for vacuum forming sheet material, the steps comprising: mixing with a thermoplastic polymer 0.5 to 10.0 percent by weight, based upon the weight of polymer, of an inert chemical desiccant, said chemical desiccant absorbing any residual moisture in said polymer; forming a sheet from said mixture of polymer and desiccant; and thereafter vacuum forming said sheet.

2. The process of claim 1 werein the thermoplastic resin is a rubber-modified polystyrene.

3. The process of claim 1 wherein the desiccant is calcium oxide.

4. The process of claim 1 wherein the resin composition contains 1–5% by weight of the desiccant.

5. The process of claim 1 wherein the desiccant is mixed with the resin in the form of a dispersion of the desiccant in a carrier liquid.

6. The proces of claim 5 wherein the carrier liquid is a mineral oil.

7. A vacuum-formed sheet of a thermoplastic resin composition containing 0.5–10%, based on the weight of the resin, of an inert chemical desiccant.

References Cited by the Examiner

UNITED STATES PATENTS

| | | | |
|---|---|---|---|
| 2,066,120 | 12/1936 | Morell. | |
| 2,218,710 | 10/1940 | Herrmann et al. | |
| 2,424,787 | 7/1947 | Adams | 260—38 |
| 2,630,425 | 3/1953 | Rodman | 260—79.3 |
| 2,760,941 | 8/1956 | Iler | 260—29.6 |

OTHER REFERENCES

Boundy-Boyer, Styrene—Its Polymers, Copolymers and Derivatives, New York, Reinhold Pub. Corp., 1952, pp. 207, 484–5, and 496–504.

Wakeman, R. L., The Chemistry of Commercial Plastics, New York, Reinhold Pub. Corp., 1947, pp. 138, 418 and 436.

ROBERT F. WHITE, *Primary Examiner.*

MORRIS LIEBMAN, *Examiner.*

M. R. DOWLING, *Assistant Examiner.*